May 28, 1940.  E. N. ARCHER  2,202,512

FOWL-STUFFING RETAINER

Filed Sept. 7, 1937

Inventor.
Edward N. Archer.

Attorney.

Patented May 28, 1940

2,202,512

UNITED STATES PATENT OFFICE 2,202,512

FOWL-STUFFING RETAINER

Edward N. Archer, Inglewood, Calif.

Application September 7, 1937, Serial No. 162,679

1 Claim. (Cl. 17—11)

My invention has to do with cooking appliances and relates particularly to devices for retaining the stuffing in fowls during the cooking.

One of the principal objects of my invention is to provide a device which may be easily applied to and removed from the fowl without piercing the skin thereof.

Another object is to provide a device which effectively retains the stuffing in the fowl under all conditions of handling.

A still further object is to produce a device which, when not in use, does not become disassembled and thus prevents the loss of parts.

A further object is to provide a device which may be economically manufactured and which presents no sharp points to injure the user. Still further objects will become apparent from the following description of one preferred form of the invention which I have chosen for illustrative purposes.

To aid the following description, I shall make reference to the accompanying drawing, in which.

Figure 1:
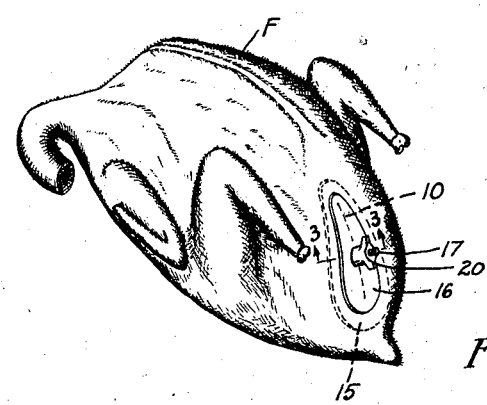
Fig. 1 is a perspective view showing my device applied to a fowl.
Figure 2:
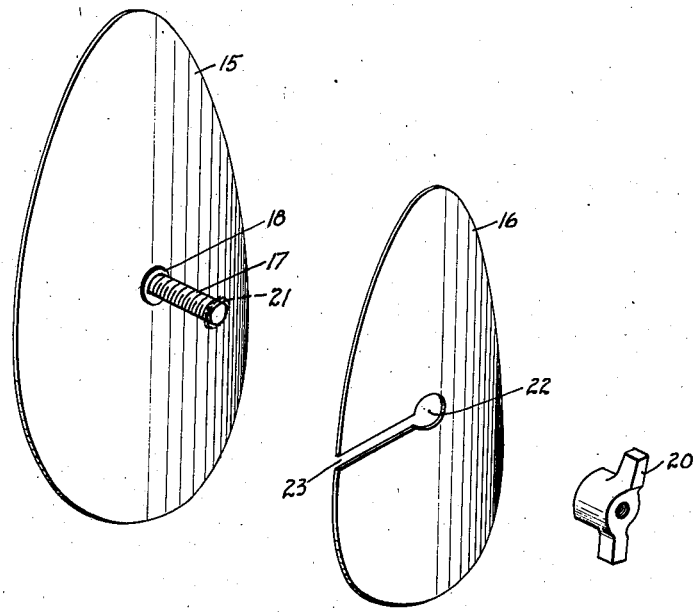
Fig. 2 is an enlarged perspective showing the various parts of my device.
Figure 3:
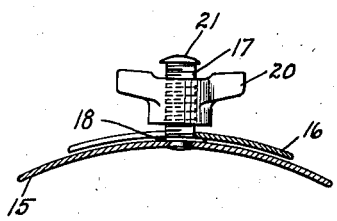
Fig. 3 is an enlarged cross-sectional view of the device taken on the line 3—3 of Fig. 1.

In the drawing, the stuffed fowl is shown at F, the stuffing having been applied through a slit 10 (shown in dotted lines in Fig. 1) in the fowl.

My stuffing retaining device consists of two substantially oval plates 15 and 16, which plates are preferably concavo-convex in cross-section. The bottom plate 15 is adapted to be inserted into the fowl through the slit, and carries at its center a screw-threaded stud 17 whose lower end is formed integral with or suitably secured to the plate. At the plate, stud 17 may be provided with a shoulder 18 for the purpose hereinafter stated, said shoulder being provided by making that part of the stud of increased diameter or by a ring or washer applied over the stud. A thumb nut 20 is threaded onto stud 17, the outer end of the stud being preferably headed, as at 21, to prevent complete removal of the nut.

The top plate 16 is preferably smaller than bottom plate 15, and has a hole 22 at its center to pass stud 17. To facilitate applying and removing plate 16, a slot 23 is provided to pass the stud into and out of hole 22.

In using my device, the fowl is first stuffed through slit 10, after which plate 15 is inserted through the slit so that its top face rests against the inner surface of the skin of the fowl around the slit. When the bottom plate 15 is thus positioned, the top plate 16 is applied by sliding it laterally onto the stud by virtue of slot 23, and the thumb nut 20 is screwed down until the skin of the fowl around the slit 10 is compressed between plates 15 and 16 sufficiently to hold the slit closed and the stuffing in during cooking. The shoulder 18 may be provided to prevent the skin of the fowl from being compressed too tightly between the plates.

While the plates may be made of any suitable material capable of freely passing the heat to enable cooking of the skin resting between the plates, I prefer to make them of aluminum.

When the cooking operation is completed, the thumb nut is released, the outer plate 16 slid off the stud and the bottom plate 15 is removed through the slit, the oval shape of the plate facilitating such removal without tearing the skin of the fowl. After being thus removed, the device may be again assembled and the thumb nut screwed down to retain the top plate in position on the bottom plate so that the parts will not become separated and lost.

While I have resorted in the foregoing description to various details of construction and combinations, I wish it understood that my invention, in its broader aspects, is not to be restricted to such details. On the contrary, it is to be restricted only as appears from the appended claim.

I claim:

A device for closing a slit in the skin of a stuffed fowl, that includes a thin oval plate of concavo-convex section adapted to be inserted through the slit and to underlie the skin surrounding the slit with its convex face outward, a thin oval plate of concavo-convex section adapted to overlie the skin surrounding the slit with its concave face inward, a screw threaded stud projection from the central portion of the convex face of the first mentioned plate and through the second mentioned plate, and a nut on the stud adapted to force the two plates together to clamp the skin between their opposed peripheral portions, whereby the two plates are clamped in position covering the slit opening.

EDWARD N. ARCHER.